(12) United States Patent
Loessel et al.

(10) Patent No.: US 7,666,969 B2
(45) Date of Patent: Feb. 23, 2010

(54) SILICONE RESIN COATING FOR ELECTRONIC COMPONENTS

(75) Inventors: Georg Loessel, Emmerting (DE); Manfred Meisenberger, Burghausen (DE); Gerhard Staiger, Kirchdorf (DE)

(73) Assignee: Wacker Chemie AG, Munich (DE)

( * ) Notice: Subject to any disclaimer, the term of this patent is extended or adjusted under 35 U.S.C. 154(b) by 442 days.

(21) Appl. No.: 11/746,676

(22) Filed: May 10, 2007

(65) Prior Publication Data

US 2007/0265410 A1 Nov. 15, 2007

(30) Foreign Application Priority Data

May 11, 2006 (DE) ........................ 10 2006 022 098
Jun. 29, 2006 (DE) ........................ 10 2006 030 003

(51) Int. Cl.
C08G 77/12 (2006.01)
C08G 77/20 (2006.01)

(52) U.S. Cl. .............................. 528/31; 528/32; 528/43

(58) Field of Classification Search ........................ None
See application file for complete search history.

(56) References Cited

U.S. PATENT DOCUMENTS

| 2,832,794 | A | 4/1958 | Gordon |
| 7,153,914 | B2 * | 12/2006 | Staiger et al. ................ 525/478 |
| 2002/0161140 | A1 | 10/2002 | Yoneda et al. |
| 2005/0137328 | A1 | 6/2005 | Staiger et al. |
| 2005/0212008 | A1 | 9/2005 | Miyoshi |
| 2006/0081864 | A1 | 4/2006 | Nakazawa |

FOREIGN PATENT DOCUMENTS

| DE | 102 12 119 A1 | 9/2003 |
| EP | 1 249 875 A2 | 10/2002 |
| EP | 1 424 363 A1 | 6/2004 |
| EP | 1544253 A2 | 12/2004 |
| JP | 2004-140220 A | 5/2004 |
| KR | 10-2006-0016107 | 2/2006 |
| WO | 2004/107458 A2 | 12/2004 |
| WO | WO 2008/036662 A2 * | 3/2008 |

OTHER PUBLICATIONS

Kopylov et al., "Features of Influence of HCl on Hydrolytic Copolycondensation of Bifunctional Organochlorosilanes with Trimethylchlorosilane", Journal of General Chemistry USSR, Consultants Bureau, New York, NY, US, vol. 61, No. 6, Jun. 1, 1991, pp. 1257-1261.
English Abstract Corresponding to DE 102 12 119 A1.
English Abstract Corresponding to JP 2004-140220 A.
Noll: "Chemie Und Technologie Der Silicone", 2nd Edition 1968, p. 574, Chapter 12.1.2.
English Version of Noll: "Chemic Und Technologie Der Silicone", i.e., "Chemistry and Technology of Silicones", 2nd Edition 1968, p. 574, Chapter 12.1.2.

* cited by examiner

*Primary Examiner*—Marc S Zimmer
(74) *Attorney, Agent, or Firm*—Brooks Kushman P.C.

(57) ABSTRACT

One-component, H-siloxane-containing addition-crosslinkable silicone resins, are prepared by charging a reactor with water and a solvent mixture of at least one aromatic solvent and at least one alkyl ester, adding a chlorosilane mixture containing an Si—H functional silane and a silane bearing an unsaturated hydrosilylatable group with stirring, the temperature not being above 50° C., separating an aqueous phase comprising a one-component, H-siloxane-containing addition-crosslinkable silicone resin, and washing the phase comprising the one-component, H-siloxane-containing addition-crosslinkable silicone resin in at least two washing steps to reduce residual HCl content, a final washing carried out using a 0.01%-1.0% strength aqueous solution of a base with a pH between 7.00-8.50, at a temperature of 20-50° C.

11 Claims, No Drawings

SILICONE RESIN COATING FOR ELECTRONIC COMPONENTS

BACKGROUND OF THE INVENTION

1. Field of the Invention

The invention relates to a process for preparing a one-component, H-siloxane-containing addition-crosslinkable silicone resin and to the silicone resin obtained thereby.

2. Background Art

On account of their temperature stability and light stability, which are superior to those of epoxy systems, silicone resins are being used with increasing frequency as encapsulant materials for electronic components. For instance, published specification DE 102 12 119 A1 discloses the high flexibility and softness that characterize such encapsulant materials.

European patent EP 1 249 875 A2 teaches that rubberlike polysilicones are used as encapsulating compounds for producing, for example, standard LEDs. These polysilicones, however, have a surface hardness of 50-90 JISA (Shore D 10), which is too soft for the required surface hardness and scratch resistance. In that patent specification, therefore, a twofold encapsulation is described as well. Over the internal silicone resin encapsulation there is a second encapsulation using, for example, epoxy resins.

Japanese laid-open specification JP 2004-140220 A claims a transparent, addition-crosslinking silicone resin having a hardness of more than 60 Shore D as an encapsulating compound for light-emitting diodes or photo detectors. This kind of silicone resin does exhibit the desired surface properties, similar to the epoxy resins. On account of the low flexibility of such resins, however, the difference in thermal expansion between silicone resin and lead frame causes major problems in the case of the temperature cycle tests the industry requires. Consequently, Japanese laid-open specification JP 2004-140220 A teaches that such silicone resins can be used not as 100% encapsulating compounds, but only in combination with an interlayer between metal lead and encapsulating resin.

Because of these above-recited product properties, high flexibility and softness, or high hardness but low flexibility, encapsulating compounds of this kind can be used only in subsegments of the market, or only with additional manufacturing steps, involving increased cost and complexity.

In European patent EP 1 424 363 A1 and US published application 2005/0212008 A1, Miyoshi describes the preparation of silicone resins for encapsulating compounds by combination of two silicone resin components: component A is a silicone resin with alkenyl groups without H-siloxane (hydrogen-Si groups), while component B is a silicone resin with H-siloxane (hydrogen-Si groups), but without alkenyl groups. Admixed with these two components A and B is an effective catalyst (described as component C).

This silicone resin composition, prepared by mixing together from two silicone resin components, results ultimately in an addition-crosslinked silicone resin having a high hardness (Shore D greater than 60) and a flexural strength of greater than 90 MPa. No details are given of the fracture propensity of the addition-crosslinked silicone resin described, on the basis of the temperature cycle tests the industry requires.

US published application 2002/0161140 A1 likewise describes the preparation of an addition-crosslinked silicone resin from in principle 2 silicone resin components: A, an alkenyl-containing, H-siloxane-free silicone resin, and B, an H-siloxane-containing, alkenyl-free silicone resin. Admixed with these two components A and B is an effective catalyst (described as component C).

A disadvantage is that this composition is composed of two components. This mixture produces addition-crosslinked silicone resins. Owing to the multiplicity of components required, the industrial preparation of such resins gives rise to an extremely large cost and complexity.

The reaction or treatment of H-siloxane-containing silicone resins with aqueous base, aqueous NaOH for example, results in the evolution of hydrogen, a fact which has been known for a long time and is described in "Chemie und Technologie der Silicone", 2nd Edition, 1968, page 574, section 12.1.2, as well as in references cited therein.

SUMMARY OF THE INVENTION

It is an object of the invention to improve on the prior art and in particular to provide a process which can be carried out easily and as far as possible without evolution of hydrogen. These and other objects are achieved by forming a single organopolysiloxane component which is addition curable, the organopolysiloxane containing both alkenyl groups and Si—H groups.

DETAILED DESCRIPTION OF THE PREFERRED EMBODIMENT(S)

The invention provides a process for preparing a one-component, H-siloxane-containing addition-crosslinkable silicone resin, which comprises:

in a first step, charging a reactor with fully demineralized water and a solvent mixture containing at least one aromatic solvent and at least one alkyl ester, in a second step, adding a chlorosilane mixture containing an alkenylchlorosilane and an Si—H functional chlorosilane to the initial charge with stirring, the temperature not being above 50° C., and in a third step, separating off the aqueous phase of the reaction mixture comprising a one-component, H-siloxane-containing addition-crosslinkable silicone resin, and in a fourth step, washing the phase comprising the one-component, H-siloxane-containing addition-crosslinkable silicone resin in one or more washing steps in order to reduce the residual HCl content, the final washing step of the one-component, H-siloxane-containing addition-crosslinkable silicone resin being carried out using a 0.01%-1.0% strength aqueous solution of a base, with a pH between 7.00-8.50, and the washing being carried out at temperatures of 20-50° C.

Description of the Preparation Process as Batch Production

For this purpose, in the first step, a reactor is charged with fully demineralized water and with a mixture of suitable solvents.

In the second step a corresponding chlorosilane mixture is added slowly to the stirred initial charge. This mixture is preferably a composition comprising at least one T unit with R being alkyl or aryl, at least three different D units with R being H, alkyl, alkenyl, and aryl, and at least one M unit with R being alkyl. Preference is given to a composition composed of T units with R being aryl, at least three different D units with R being H, alkyl, alkenyl, and alkyl/aryl, and also at least one M unit with R being $C_{1-3}$ alkyl. Particular preference is given to a composition composed of T units with R being $C_6$ aryl, at least three different D units with R being vinyl-methyl, H-methyl, and phenyl-methyl, and of M units with R being methyl C.

In this case the HCl that is formed dissolves in the aqueous phase. A characteristic feature of this step is that, during the addition of the chlorosilane mixture, the temperature of the reaction mixture does not increase above 50° C.

In the third step, the aqueous phase of the reaction mixture comprising the one-component H-siloxane-containing addition-crosslinkable silicone resin is separated.

In a fourth step, the phase comprising the one-component, H-siloxane-containing addition-crosslinkable silicone resin is carefully washed in one or more washing steps to extremely low residual HCl contents. A characteristic feature of this fourth step is that the final washing of the one-component, H-siloxane-containing addition-crosslinkable silicone resin is preferably carried out using a 0.01%-1.00% strength aqueous solution of a suitable base, more preferably a 0.01%-0.1% strength aqueous solution, yet more preferably a 0.01%-0.05% strength aqueous solution, and most preferably a 0.01% to 0.02% strength solution. Suitable bases include alkali metal and alkaline earth metal hydroxides, preferably sodium hydroxide, more preferably sodium hydrogen carbonate, at a pH of 7.0-8.5, preferably 7.5 to 8.5, the washing being carried out at temperatures of 20-50° C., preferably without evolution of gaseous hydrogen in an amount above 40 ppm, and more preferably with no hydrogen evolved.

In this manner, one-component, H-siloxane-containing addition-crosslinkable silicone resins are obtained which preferably have residual HCl contents of less than 3 ppm, more preferably one-component, H-siloxane-containing addition-crosslinkable silicone resins having residual HCl contents of 0-1 ppm. In a final, fifth step, the crude product thus purified, still containing solvent, is gently freed from solvent by distillation.

The process of the invention surprisingly produces a one-component, H-siloxane-containing addition-crosslinkable silicone resin in a one-pot synthesis without elimination of hydrogen.

The invention further provides a one-component addition-crosslinkable silicone resin which comprises the resin fractions M, D and T with the general formula 1:

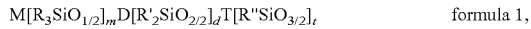

$$M[R_3SiO_{1/2}]_m D[R'_2SiO_{2/2}]_d T[R''SiO_{3/2}]_t \qquad \text{formula 1,}$$

where the one-component addition-crosslinkable silicone resin is identified by m, d, and t being greater than 0, and by m being 0.01%-1.00% by weight, d being 50.00%-65.00% by weight, and t being 30.00%-50.00% by weight, and R are $C_{1-3}$ hydrocarbons, preferably methyl, $R'_2$ are monounsaturated $C_{2-3}$ hydrocarbons, preferably vinyl, $C_{1-3}$ hydrocarbons H, and are aromatic hydrocarbons, preferably phenyl, and R" denotes aromatic, preferably phenyl, and saturated hydrocarbons. The one-component addition-crosslinkable silicone resin thus prepared is preferably such that m is 0.01%-0.60% by weight, d is 57.00%-63.00% by weight, and t is 35.00%-40.00% by weight. With particular preference the one-component addition-crosslinkable silicone resin is such that m is 0.01%-0.58% by weight, d is 60.00%-62.50% by weight, and t is 36.00%-37.50% by weight.

Examples of R are preferably methyl, ethyl, and propyl. Examples of R' are preferably H, methyl, ethyl, propyl, vinyl, propenyl, and phenyl. Examples of R" are preferably phenyl, chlorophenyl, naphthyl, biphenylyl, methylphenyl, methyl, ethyl, and propyl.

Furthermore, in the one-component addition-crosslinkable silicone resin thus prepared, $R'_2$ of the resin fraction D is made up of R'a is a monounsaturated $C_{1-3}$ hydrocarbon, preferably vinyl or propenyl, R'b is H—Si group, R'c is a $C_{1-3}$ hydrocarbon, preferably methyl, ethyl, propyl, and R'd is an aromatic hydrocarbon, preferably phenyl, with a:b:c:d in the ratio of 1:1.03:3.7-4.4:1.66-2.4.

With very particular preference, in a one-component addition-crosslinkable silicone resin, $R'_2$ of the resin fraction D is made up of R'a, is a monounsaturated $C_{1-3}$ hydrocarbon, preferably vinyl, R'b is an H—Si group, R'c is a $C_{1-3}$ hydrocarbon, preferably methyl, and R'd is an aromatic hydrocarbon, preferably phenyl, where a:b:c:d=1:1.03:4.2-4.4:2-2.4.

In accordance with the invention the one-component addition-crosslinkable silicone resin thus prepared is crosslinked using a catalyst, examples being metals such as platinum, rhodium, palladium, ruthenium, and iridium, preferably platinum. As platinum catalysts it is preferred to use platinum metals and/or their compounds, preferably platinum and/or its compounds. Examples of such catalysts are metallic and finely divided platinum, which may be on supports such as silica, alumina or activated carbon, or compounds or complexes of platinum, such as platinum halides, e.g., $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, especially platinum organo complexes, preferably platinum-divinyltetramethyldisiloxane complexes with or without detectable inorganically bonded halogen, bis (gamma-picoline)platinum dichloride, and also reaction products of platinum tetrachloride with olefin and primary amine or secondary amine or with primary amine and secondary amine, such as the reaction products of platinum tetrachloride, in solution in 1-octene, with sec-butylamine, or ammonium-platinum complexes, platinum catalysts for 1K (one-component) systems, such as microencapsulated platinum complexes or, for example, platinum-acetylide complexes.

The transition metal catalyst is used preferably in amounts of 0.5 to 500 ppm by weight (weight fractions per million parts by weight), in particular 2 to 400 ppm by weight, calculated in each case as elemental transition metal and based on the total weight of the A and B component, preference being given to those platinum compounds which are soluble in polyorganosiloxanes. Examples of soluble platinum compounds that can be used include the platinum-olefin complexes of the formulae $(PtCl_2 \cdot olefin)_2$ and $H(PtCl_3 \cdot olefin)$, particular preference being given to the platinum-divinyltetramethyldisiloxane complexes.

Crosslinking takes place at 150° C. over about 1-2 h, and produces an addition-crosslinked silicone resin which is distinguished by high surface hardness, Shore D greater than 60, and flexural strength greater than 35 N/mm², and at the same time by high elasticity, expressed by low fracture propensity, such that the fracture propensity is 0-2 after at least 50 TST (thermal shock test) cycles.

The above-described addition of an effective catalyst preferably leads to the following system:
H-Siloxane-containing silicone resin, one-component form: less than or equal to 99 parts
Effective catalyst: greater than or equal to 1 part.

EXAMPLES

Two examples are described here: Examples 1 and 2, as a one-component, H-siloxane-containing, addition-crosslinkable silicone resin of the invention; Reference Example 2, a prior-art addition-crosslinkable silicone resin from Wacker Chemie AG: Silres H62A. (See also patent JP 2004-140220A).

Example 1

One-Component, H-Siloxane-Containing, Addition-Crosslinkable Silicone Resin

A 60 liter glass flask equipped with stirrer, provision for heating, distillation column with condenser, and dropping funnel is charged with 19,360 g of FD (fully demineralized) water, 6537 g of ethyl acetate, and 14,763 g of toluene.

Added with stirring to this initial charge by means of the dropping funnel over the course of 1.5-2 h, is a chlorosilane mixture consisting of 3807 g of phenylsilane, 3440 g of phenylmethylsilane, 1502 g of H-methylsilane, 1457 g of vinylmethylsilane and 60 g of M3-silane (trimethylchlorosilane). In the course of this addition the temperature of the reaction mixture increases from 18-20° C. at the beginning of metering to 40-50° C. at the conclusion of metering.

After reaction has taken place, the HCl-containing aqueous phase is separated from the solvent mixture containing the product.

After twofold washing with 18,000 g of FD water each time, the H-siloxane-containing addition-crosslinkable silicone resin thus prepared is washed, in a third and final washing operation, with an aqueous base consisting of 18,000 g of FD water, and 180 g, 18.0 g, 9.0 g, 3.6 g, or 1.8 g, respectively, of sodium hydrogen carbonate, the aqueous solution having a pH of 7.50-8.5, without hydrogen being produced. In each case the residual HCl content of the H-siloxane-containing addition-crosslinkable silicone resin dissolved in the solvent mixture is reduced to less than 1 ppm.

This is followed by the separation of the solvent mixture from the H-siloxane-containing addition-crosslinkable silicone resin by means of gentle distillation.

Example 2

One-Component, H-Siloxane-Containing, Addition-Crosslinkable Silicone Resin

A 60 liter glass flask equipped with stirrer, provision for heating, distillation column with condenser, and dropping funnel is charged with 19,360 g of FD (fully demineralized) water, 6537 g of ethyl acetate and 14,763 g of toluene.

Added with stirring to this initial charge by means the vessel, a dropping funnel over the course of 1.5-2 h, is a chlorosilane mixture consisting of 3807 g of phenylsilane, 1903 g of phenylmethylsilane, 1502 g of H-methylsilane, 1457 g of vinylmethylsilane and 60 g of M3-silane. In the course of this addition the temperature of the reaction mixture increases from 18-20° C. at the beginning of metering to 40-50° C. at the end of metering.

After reaction has taken place, the HCl-containing aqueous phase is separated from the solvent mixture containing the product.

After twofold washing with 18,000 g of FD water each time, the H-siloxane-containing addition-crosslinkable silicone resin thus prepared is washed, in a third and final washing operation, with an aqueous base consisting of 18,000 g of FD water, and 180.0 g, 18.0 g, 9.0 g, 3.6 g, or 1.8 g, respectively, of sodium hydrogen carbonate, the aqueous solution having a pH of 7.0-8.5, without hydrogen being produced. In each case the residual HCl content of the H-siloxane-containing addition-crosslinkable silicone resin dissolved in the solvent mixture is reduced to less than 1 ppm.

This is followed by the separation of the solvent mixture from the H-siloxane-containing addition-crosslinkable silicone resin by means of gentle distillation.

Reference Example 2

Silres H62A; standard product of Wacker Chemie AG, corresponding to the existing state of the art (see patent JP 2004-140220 A).

A 4 liter three-neck flask equipped with drain, thermometer, condenser, stirrer and feed vessel is charged at room temperature with 1312.5 g of a chlorosilane mixture and 580 g of toluene.

The silane mixture is composed of the components phenyltrichlorosilane, H-methyldichlorosilane, vinylmethyldichlorosilane and trimethylchlorosilane in a ratio of 1:0.2:0.2:0.3 (based on phenyltrichlorosilane). Added dropwise to the stirred initial charge is 185 g of ethanol over the course of 40 minutes. This reaction mixture is then stirred for 5 minutes.

Subsequently, 250 g of water (fully demineralized) are metered over the course of 2 hours into the stirred reaction mixture. This mixture is stirred for 10 minutes. Thereafter, the resulting reaction mixture is admixed with 15.65 g of trimethylchlorosilane and then stirred for 4 minutes more, and is then boiled under reflux at 75-85° C. for 2 hours.

After the reflux boiling, the batch is admixed with 187.5 g of toluene and 170 g of water (fully demineralized). This mixture is stirred for 10 minutes, before being left to stand without stirring for 40 minutes (phase separation).

The aqueous phase is separated off and the remaining phase, containing the silicone resin, is additionally washed with 500 g of water (fully demineralized), the aqueous phase is separated off, and the solvent-containing silicone resin obtained is freed from the solvent by means of distillation.

Comparison of the Properties of Surface Hardness (Shore D) and Flexural Strength The inventive one-component, H-siloxane-containing, addition-crosslinkable silicone resin and also the industrially available addition-crosslinkable silicone resin Silres H62 A (reference example 2) are each mixed 99:1 with an effective catalyst component, namely platinum-divinyltetramethyldisiloxane complex, and cured at 150° C. for 2 hours.

The addition-crosslinked silicone resins thus obtained exhibit the following pattern of properties:

|  | Shore D | Flexural strength N/mm$^2$ |
|---|---|---|
| Example 1 | 73 | 40 |
| Example 2 | 65 | 45 |
| Reference example 2 | 60 | 20 |

Comparison of Flexibility, Taking as an Example the Fracture Propensity of LEDs Produced from Example 1 and from Reference Example 2:

Here, the fracture propensity immediately after crosslinking and after passage through corresponding cycles of the thermal shock test (TST) is represented using a scale from 0 to 5. On this scale, 0-2 denotes no cracks or just a few microscale cracks in the specimen, and 3-5 denotes numerous microscale cracks or a few to many macroscale cracks in the specimen. Moreover, a result of 0-2 denotes a low fracture propensity, while a result of 3-5 denotes significant to severe fracture propensity. In the course of this thermal shock test, the specimen is exposed to temperature cycles from −40° C. to 110° C.

This test is carried out using corresponding specimens which are composed of a support system and the 100% silicone encapsulating compound, plus the corresponding fraction of an effective catalyst. The specimens thus prepared are then cured at a temperature of 150° C. for 2 h. The 100% silicone encapsulating compound is composed of the inventive addition-crosslinkable, H-siloxane-containing silicone resin, i.e., example 1, and the reference example 2 is an addition-crosslinkable silicone resin conforming to the present state of the art, Silres H62A from Wacker Chemie AG (see patent JP 2004-140220 A).

The results from this TST testing are listed below:

|  | Fracture propensity | |
| --- | --- | --- |
|  | after 10 cycles | after 55 cycles |
| Example 1 | 0 | 2 |
| Example 2 | 2 | 2 |
| Reference example 2 | 5 | 5 |

The inventive one-component, H-siloxane-containing addition-crosslinkable silicone resins are notable as addition-crosslinked silicone resins with high surface hardness (Shore D greater than 60) in conjunction with high flexibility (flexural strength N/mm$^2$) and low fracture propensity.

In contrast to this, an addition-crosslinkable silicone resin of reference example 2, which shows the existing state of the art, exhibits a markedly pronounced fracture tendency, on account of the composition of the molecular moiety D, which is different than that of the one-component, H-siloxane-containing addition-crosslinkable silicone resin of the invention and is composed of $[R_2"SiO_{2/2}]d$, with $R_2"$ being composed only of H and vinyl (see patent JP 2004-140220 A).

Application Opportunities for One-Component H-Siloxane-Containing Addition-Crosslinkable Silicone Resins Accordingly the one-component, H-siloxane-containing addition-crosslinkable silicone resins prepared in accordance with the invention can be used as 100% resin for the coating of electrical and electronic components in the widest sense.

In particular, in accordance with their special properties, these one-component, H-siloxane-containing addition-crosslinkable silicone resins can be used for producing light-emitting diodes, LEDs, or for the coating of electrical motors, examples being traction motors or hybrid motors.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A one-component addition-crosslinkable silicone resin which comprises the resin fractions M, D and T with the general formula 1:

$$M[R_3SiO_{1/2}]_m D[R'_2SiO_{2/2}]_d T[R"SiO_{3/2}]_t \qquad \text{formula 1,}$$

where the one-component addition-crosslinkable silicone resin is identified by m, d, t greater than 0 and by m=0.01%-1.00% by weight, d=50.00%-65.00% by weight, and t=30.00%-50.00% by weight, and R is a $C_{1-3}$ hydrocarbon; $R'_2$ is a $C_{2-3}$ monounsaturated hydrocarbon, a $C_{1-3}$ hydrocarbon H, or aromatic hydrocarbons; and R" is an aromatic or nonaromatic hydrocarbon.

2. The one-component addition-crosslinkable silicone resin of claim 1, wherein R is methyl, $R'_2$ is vinyl, methyl, H, and phenyl, and R" is phenyl.

3. The one-component addition-crosslinkable silicone resin of in claim 1, wherein m is 0.01%-0.60% by weight, d is 57.00%-63.00% by weight, and t=35.00%-40.00% by weight.

4. The one-component addition-crosslinkable silicone resin of in claim 2, wherein m is 0.01%-0.60% by weight, d is 57.00%-63.00% by weight, and t=35.00%-40.00% by weight.

5. The one-component addition-crosslinkable silicone resin of claim 1, wherein m is 0.01%-0.58% by weight, d is 60.00%-62.50% by weight, and t=36.00%-37.50% by weight.

6. The one-component addition-crosslinkable silicone resin of claim 5, wherein m is 0.01%-0.58% by weight, d is 60.00%-62.50% by weight, and t=36.00%-37.50% by weight.

7. The one-component addition-crosslinkable silicone resin of claim 1, wherein $R'_2$ in D is made up of R'a $C_{2-3}$ monounsaturated hydrocarbons, R'b H—Si groups, R'c $C_{1-3}$ hydrocarbons, and R'd aromatic hydrocarbons, where the weight ratio of a:b:c:d is 1:1.03:3.7-4.4:1.66-2.4.

8. The one-component addition-crosslinkable silicone resin of claim 1, wherein $R'_2$ in D is made up of $C_{2-3}$ R'a monounsaturated hydrocarbons, R'b H—Si groups, R'c $C_{1-3}$ hydrocarbons, and R'd aromatic hydrocarbons, where the weight ratio of a:b:c:d is 1:1.03:4.2-4.4:2-2.4.

9. A crosslinked silicone resin wherein a one-component addition-crosslinkable silicone resin of claim 1 is crosslinked and the addition-crosslinked silicone resin has a surface hardness of greater than 60 Shore D at 25° C., a flexural strength greater than 35 N/mm$^2$, and a fracture propensity of 0-2 after at least 50 TST cycles.

10. A shaped body which is a silicone resin of claim 9.

11. The shaped body of claim 10, which is a coating.

* * * * *